Patented Aug. 14, 1945

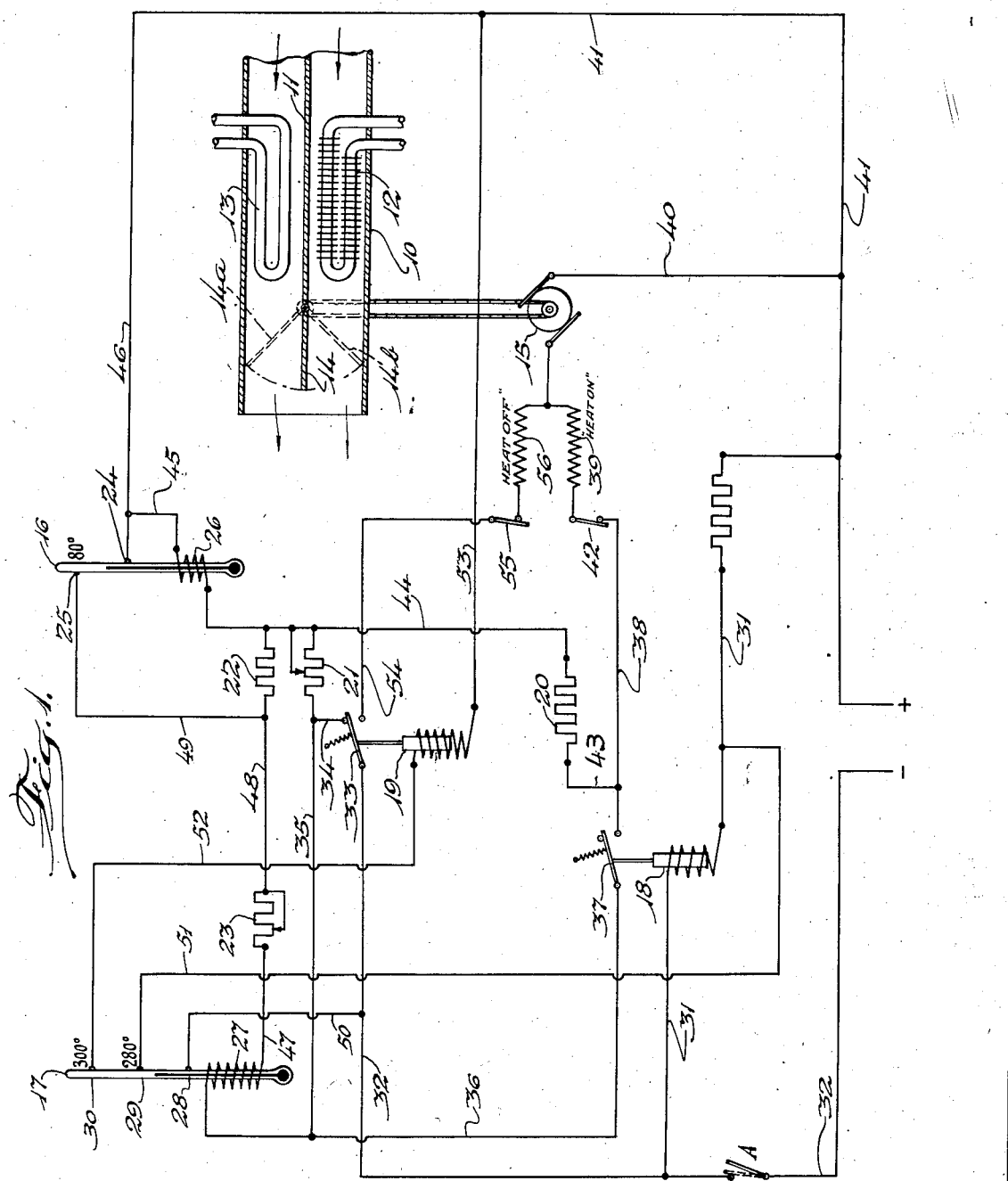

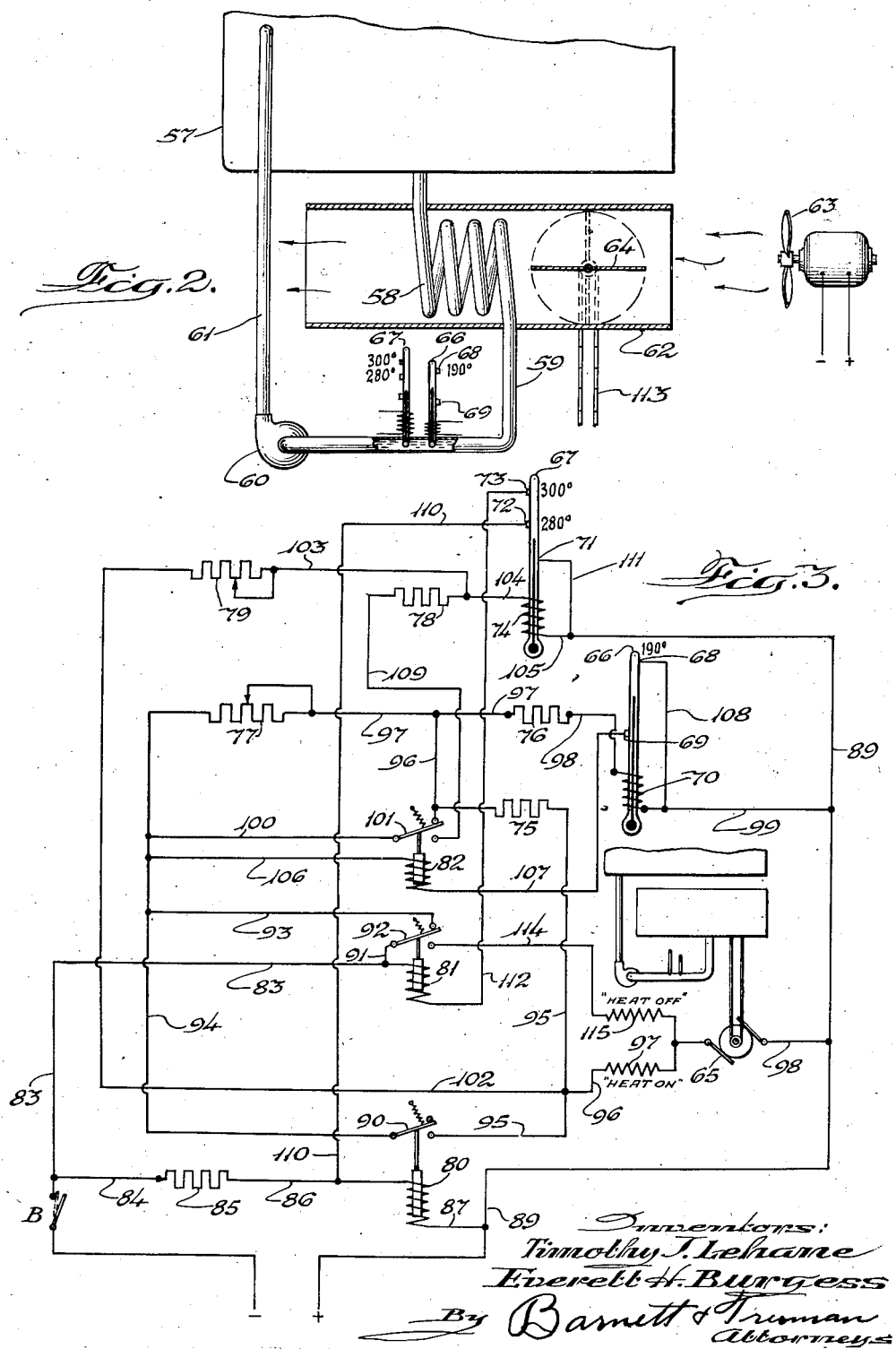

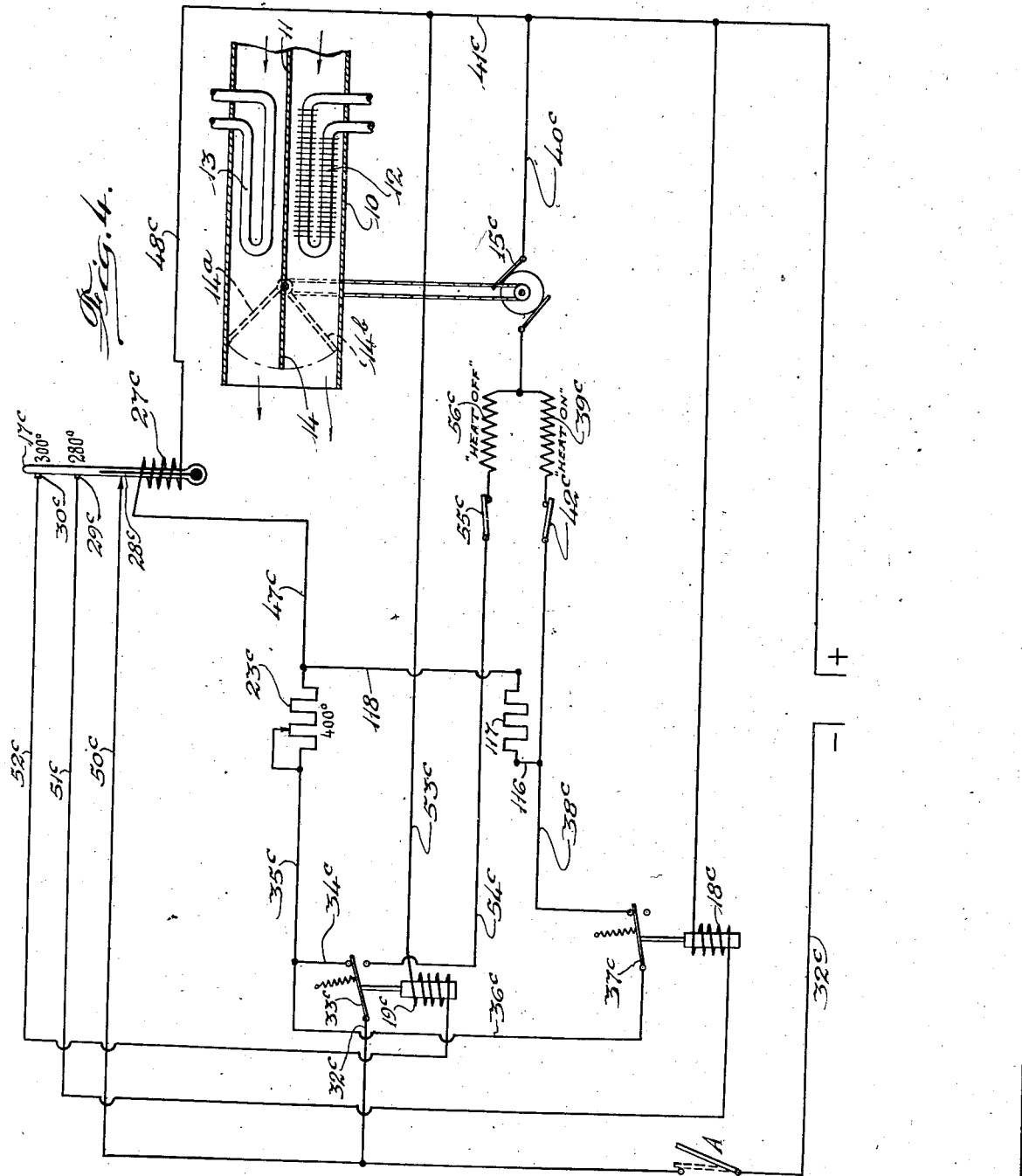

2,382,073

UNITED STATES PATENT OFFICE 2,382,073

THERMOSTAT CONTROL CIRCUIT

Timothy J. Lehane and Everett H. Burgess, Chicago, Ill., assignors to Vapor Car Heating Company, Inc., Chicago, Ill., a corporation of New York Application August 9, 1943, Serial No. 497,938

12 Claims. (Cl. 257—3)

This invention relates to certain new and useful improvements in a thermostatically controlled electric circuit.

A principal object of the invention is to provide a thermostatically controlled circuit in which a master thermostat and a control thermostat each function, under pre-determined conditions, to adjust the position of the other by means of direct heat winding connections between the thermostats.

A further object is to provide a thermostatically controlled circuit of the above character which is particularly suitable for effecting modulated operation of means so controlling the heating of a space that the temperature thereof will be maintained substantially constant.

For the purpose of this application, the term "space" is employed to designate any room, conduit, container or other enclosure in which it may be desirable to maintain a predetermined temperature.

The thermostats, in addition to being influenced by the temperature of the space, are heated by auxiliary heat so as to anticipate the temperature of the space at which the thermostats are set to function. The invention also contemplates applying a large amount of auxiliary heat to the control thermostat so as to increase its sensitivity to any change in the temperature of the space being controlled.

In order to insure the desired sensitivity of the thermostats, provisions are made to bring about a functioning of the thermostats in anticipation of a slight change in temperature of the controlled space before such change has been actually reflected in the temperature of the space being controlled. In this connection, it will be observed that each thermostat, under predetermined conditions operates to influence the application of heat to the other thermostat and in this way puts such thermostat in readiness to intercept or oppose a change in temperature before any substantial change is reflected in the actual temperature of this space being controlled.

A further and somewhat general object of the invention includes the provision of a thermostatically controlled circuit in which a self-cycling thermostat is so connected in the circuit that its self-cycling action is varied in relation to the condition of other elements in the circuit. Specifically, this feature of the invention includes a provision of a control circuit in which a thermostat is so connected with a plurality of resistors adapted to be cut in and out of the thermostat circuit in response to changes taking place in the temperature of the controlled space or in operating changes of other elements in the circuit, so as to vary the amount of auxiliary heat applied to the thermostat, and consequently the rate or frequency of its cycling action.

A further object of the invention includes provisions whereby auxiliary heat may be applied to both the master thermostat and the control thermostat in a desired manner to minimize any lag between the cooperative functions of these elements.

In situations where the current used is of such intensity as to cause substantial sparking at thermostat contacts, the invention includes the provision of suitably arranged relays or other devices for preventing such sparking.

Inasmuch as the invention may be embodied in control circuits for use in many situations either directly or indirectly associated with a controlled temperature, three specific embodiments are shown herein. It should be understood, however, that the specific circuits herein shown, as well as the control temperatures used, are merely illustrative and are not intended as limitations on the scope of the invention or on the uses for which the control system is adapted.

In the drawings, Fig. 1 illustrates diagrammatically a means for heating or cooling a space together with a control circuit for modulating the position of a damper for controlling the supply of heat delivered to the said space.

Fig. 2 is a diagrammatic representation of a mechanism for maintaining the temperature of a circulating fluid, for example, the oil of an engine crank case at a predetermined temperature.

Fig. 3 is a diagram of the control circuits employed in connection with the fluid circulating system shown in Fig. 2; and Fig. 4 is a modified circuit for controlling a reversible motor similar to the embodiment shown in Fig. 1, but using only one thermostat.

Referring first to Fig. 1 of the drawings, 10 designates a conduit for directing air into a space whose temperature is being controlled. The conduit, for a portion of its length, is provided with a partition 11 which divides it into two passages. A heating element 12 is positioned in one of the passages and a cooling element 13 is positioned in the other. A damper 14 is located in the conduit to control the amount of heated or cooled air entering the controlled space. In one extreme position of the damper, for example a position 14ª, indicated in dotted lines, only heated air can be introduced into the space. In the other extreme position 14ᵇ, only cooled air can be introduced into the space. However, whenever the damper is in any intermediate position, both heated and cooled air are admitted in proportion determined by the position of the damper. The operation of the damper is modulated by means of a reversible motor 15 whose movements are controlled in relation to the temperature of the controlled space. If the said space is maintained at the desired temperature, the damper operating motor 15 will remain inactive. If there should be a slight change in the temperature of the space, the control motor 15 will be operated in the proper direction to effect a compensating adjustment of the damper so as to increase or reduce the supply of heat to the space as may be required to balance the control system.

One approved control circuit for modulating the position of motor 15 comprises a master thermostat 16, a control thermostat 17, a relay 18, a relay 19 and a plurality of cycle resistors 20, 21, 22 and 23, and connectors for connecting the above elements in the manner hereinafter described.

Both thermostats 16 and 17 are of the mercury-column type and are arranged in the space being controlled so as to be influenced in their operation by the temperature of said space. The thermostats are manufactured to function at certain pre-determined temperatures. However, the thermostats may be caused to function at any desired lower temperature of a controlled space by applying auxiliary heat to the thermostats to compensate for the difference between the desired temperature of the space being controlled and the actual temperature, at the thermostat, which will cause the mercury columns of the thermostats to engage their contacts. The specific functioning of the temperatures of the thermostats will be different for different situations. This is also true of the temperature range between the contacts of the thermostats when they are constructed, as is the case of the control thermostat of the present invention, to maintain a fixed range between upper and lower contacts, between which the mercury column is maintained when the control system is in balance, that is to say, a fixed range in which the mercury column of the thermostat may oscillate without resulting in any change in operation of the control system. For the purpose of this application, the master thermostat is shown as having two contacts 24 and 25. The lower contact 24 is preferably positioned to be normally engaged by the mercury column on the thermostat during the entire operation of the system. The upper contact 25 is positioned to be engaged by the mercury column when the temperature at the thermostat reaches 80°. An electric heater 26 is connected with the cycle-resistors 20, 21 and 22 so that one or more of the circuits, in which said resistors are positioned, may function to apply predetermined amounts of auxiliary heat to the master thermostat. The said resistors may be designed to apply any suitable amount of auxiliary heat. However, for the present purpose, the resistors 20, 21 and 22 are made so that each resistor in combination with the winding of coil 26 will apply approximately four degrees of auxiliary heat to the master thermostat. Hence, when only one cycle resistor is in circuit with the thermostat heater 26, thermostat 16 will function at a room temperature of 76° plus said 4° added heat. For each additional resistor put in circuit with said heater 26, an additional 4° of heat will be added thereto.

The control thermostat 17 is shown herein as having a heater coil 27 and three contacts 28, 29 and 30. The lower contact may be placed at any suitable location so as to be engaged by the mercury column of the thermostat during the normal operation of the control system. The middle contact 29 is placed at a location to be engaged by the mercury column of the thermostat at any suitable temperature of the thermostat within its range of operation, for example at 280°. The top contact 30 is positioned to function at a higher temperature, for example 300°.

The present disclosure contemplates adding 400° auxiliary heat to the control thermostat. It will be apparent, therefore, that if the full amount of 400° of auxiliary heat were added for an appreciable period of time, the mercury column would rise to a position corresponding to the room temperature plus the 400° of heat or 176° above the upper contact 30. This assumed condition is never obtained, since engagement of the mercury column of the control thermostat with the upper contact 30 results in breaking the energizing circuits for the heater coils 26 and 27 of both thermostats, and thereby permits the heater coils to cool so as to effect a relatively abrupt recession of the mercury columns from the upper contacts of both thermostats. However, it will be observed, in this connection, that the 400° of added heat to the control thermostat, together with the position of the upper contact thereof, at 300° insures frequent engagement of the mercury column with the upper contact during the normal operation of the thermostat. The temperature spacing between the upper contact and the middle contact is only 20°, and it is within this space that the mercury column is normally maintained when the control system is in balance. It will be observed, therefore, that the middle contact 29 of the thermostat functions at a room temperature of 76° plus 204° added heat.

The manner in which the thermostats cycle, that is to say, the manner in which the mercury columns of the thermostats engaged their upper contacts and then receded from said contacts, will be apparent from the description of the specific circuits which may be in control of the thermostats from time to time. Assuming that the control system is de-energized, that the damper 14 is in a position to deliver equal amounts of heated and cooled air to the controlled space, and that the temperature of the said controlled space is 2° below the desired temperature of 76°, the manual closing of the switch A establishes a circuit through wire 31 to energize the coil of relay 18. This energization of relay 18 moves its armature 37 to a position to close an energizing circuit through one field of the motor 15 to cause the motor to rotate in a direction to adjust the position of the damper 14 so as to supply more heat to said space. This circuit includes the negative line 32, armature 33 of the de-energized relay 19, wires 34, 35 and 36 through armature 37 of energized relay 18, thence through wire 38 and field 39 of the motor 15 to wire 40 leading to the positive line 41. The operation of motor during the initial heat-up of the space will continue until the damper 14 assumes its maximum heat delivery position. At this time the motor circuit will be broken automatically by opening of a limit switch 42. After the space is heated and the control system is more nearly in balance, the motor 15 will operate only momentarily to impart a slight change in the position of damper 14.

When the "heat-on" circuit through the motor 15 is closed, there are normally three parallel circuits available to supply electric current to the heater coil 26 of the master thermostat. One of these circuits leads from the movable contact 37 of the energized relay 18, by wires 38 and 43, cycle resistor 20, wire 44, heater coil 26, and wires 45 and 46 to the positive line 41.

A second parallel circuit leads from the armature 33 of de-energized relay 19 through wire 34, adjustable cycle resistor 21, wire 44, heater coil 26, and wires 45 and 46 to the negative line 41.

The third of said parallel circuits leads from the armature 33 of de-energized relay 19, through wires 34, 35 and 36 to heater coil 27 of the control relay, and thence through wire 47, resistor 23, wire 48, resistor 22, wire 44, heater coil 26, and wires 45 and 46 to the negative line 41.

The resistor 23 does not add any additional heat to the heater coil 26, since its function is merely to determine the intensity of current passing through the heater coil 27 during the functioning of control thermostat 17. The said resistor 23, therefore, may be incorporated in the heater 27 at the time of its manufacture to provide the desired value or it may be retained as a variable resistor as shown herein so that the effective position of contacts 29 and 30 may be varied relative to the desired temperature of the controlled space. For example, if it should be desired to control the space at a temperature of 78° instead of the 76° herein previously mentioned, the resistor 23 and also, if desirable, the resistor 21 may be adjusted to reduce the amount of auxiliary heat to the thermostats and thereby maintain a higher temperature in the space being controlled. This change in the temperature of the space can be obtained without altering the fixed temperature spacing between contacts 29 and 30. It will also be observed in this connection that the single thermostat 17, together with relays 18 and 19, function to effect modulated movements of the motor 15 in opposite directions, and can be included in a system without the functions of the master thermostat. A modified circuit of this character is illustrated in Fig. 4 of the drawings and will be described hereinafter.

The passage of current through the heater coil 27 to the heater 26 of the master thermostat adds some heat thereto, but this added heat is insufficient, because of the higher intensity of heater 27, to cause it to function. It will be seen, however, that approximately 12° of heat can be added to the master thermostat 16 by virtue of the three parallel circuits containing the cycle resistors 20, 21 and 22, respectively. Consequently, during the initial heat-up of the system, the mercury column of the master thermostat is caused to move into engagement with its contact 25 in a relatively short period of time. In view of the fact that approximately 12° is added to the thermostat 16, during the initial heat-up thereof, it will be apparent that the mercury column thereof will reach the upper column 25 before the temperature of the space being controlled has been raised to the desired temperature of 76°. The rise of the mercury column in the master thermostat to engage the upper contact 25 thereof permits the electric current flowing through the heater 27 of the control thermostat to pass directly from wire 48 through wire 49, contact 25, mercury column of the master thermostat to contact 24 and thence through wire 46 to the positive line 41.

This circuit removes the resistor 22 from the circuit of heater coil 26 and consequently permits sufficient cooling of the master thermostat to permit its mercury column to recede from its engagement with said upper contact 25. Therefore, the circuit closed through said upper contact 25 is only momentary. However, such closing of a circuit through said contact establishes a momentary 400° heating circuit through the heater coil 27 of control thermostat 17. As soon as the circuit through said contact 25 is broken by the cooling of the thermostat 16 and consequent recession of its mercury column, the resistor 22 is again made effective to add heat to the heater coil 26 so as to again cause the mercury to engage the contact 25 and thereby establish another momentary 400° heating circuit through the heater coil 27 of the control thermostat. This cycling action will continue until the auxiliary heat impulses supplied to the heater coil 27 of the control thermostat are sufficiently frequent to cause the mercury column thereof to engage the 280° contact 29.

When the mercury column of the said control thermostat engages the said middle contact 29, a circuit is closed from the negative line 32, through wire 50, contact 28, mercury column of the control thermostat, middle contact 29, and wire 51 to a point in the relay energizing circuit 31 which by-passes the current around the coil of relay 18, and thereby deenergizes the relay. By de-energizing the relay 18, the "heat-on" motor circuit is broken and also the heater circuit through resistor 20. However, the adjustable resistor 21 remains in circuit with said coil, so that 4° of heat is added to the heater coil 26 of the master thermostat by virtue of the previously described circuit through said resistor 21. The resistor 22 is also intermittently added and removed from the circuit during the cycling of the master thermostat as previously described.

It will be noted from the above description that during the time the mercury column of control thermostat 17 remains below the middle contact 29, all cycling action of the master thermostat 16 is for the purpose of adjusting the control thermostat by applying heat impulses thereto to raise its mercury column into engagement with the middle contact 29. In effect, the master thermostat informs the control thermostat that a change of temperature in the space can be expected and endeavors to so adjust or condition the control thermostat as to intercept and oppose the change in temperature by opening the "heat on" circuit through motor 15. This cycling action, and consequently the said adjustment of the control thermostat 17 will continue until the temperature of the space being controlled rises to a point near the desired temperature of 76°. At this time the cycling of master thermostat will be more frequent and therefore increases the frequency of impulses through heater 27 of control thermostat until its mercury column engages its upper contact 30. However, if conditions should develop, during the said adjustment of the control thermostat, to cause its mercury column to drop below the middle contact 29, the relay 18 will again be energized so that its armature will move to a position to reclose the heater circuit containing the cycle resistor 20 so as to add more heat to the master thermostat 16 and thereby adjust its mercury column toward its upper contact 25.

As soon as the mercury column of the control thermostat 17 engages the 300° contact 30, a circuit is established through wire 52, coil of relay 19 and wire 53 to the positive line. This circuit energizes relay 19 so as to move its armature 33 to a position to close a reverse or "heat off" circuit through motor 15 as follows: negative line 32, armature 33 of energized relay 19, wire 54, limit switch 55, "heat off" field 56 of the motor 15 thence through the motor armature and wire 40 to the positive line 41. This motor circuit energizes the motor so as to move the damper 14 in direction to reduce the amount of heat. In addition to closing the last mentioned motor energizing circuit, the energization of relay 19 breaks all circuits then effective to apply heat to heater coils of both thermostats. This results in a sudden recession of the mercury columns of both thermostats from their upper contacts. Such recession results in again de-energizing the relay 19 so as to re-establish the heater circuits containing cycle resistors 21 and 22 for the master thermostat. When this is done, the mercury column of the master thermostat is again moved into engagement with its upper contact 25 and heat impulse is thereby again passed through the heater coil 27 of the control thermostat to again raise its mercury column toward the 300° contact 30. If said column actually engages the contact 30, there will be another energizing impulse established through the relay 19 so as to again close the circuit through the "heat off" field of the motor 15 and thereby impart another adjusting movement to the damper 14 in a direction to reduce the amount of heat and increase the amount of cooled air delivered to the space. This momentary making and breaking of the circuit through the motor 15 will continue until the system comes into substantial balance, at which time the mercury column of the master thermostat will be maintained at a height slightly below the upper contact 25, and the mercury column of the control thermostat 17 will be maintained at a location between the contacts 29 and 30.

From the above, it will be seen that the master thermostat 16 functions to adjust the height of the mercury column in the control thermostat 17, when the said mercury column is below the contact 30. However, as soon as the mercury column of the control thermostat engages the said upper contact 30, and also when the said mercury column drops below the contact 29, the said control thermostat functions to adjust the position of the mercury column of the master thermostat. By the mutual adjustments of the thermostats, the control system is quickly moved to a position of substantial balance, and if there are any conditions encountered which cause the mercury column of the control thermostat to drop below the middle contact 29, the heater circuits containing cycle resistors 20, 21 and 22 are again closed so as to re-establish a balanced condition.

Referring now to the embodiment illustrated in Figs. 2 and 3 of the drawings: In this modified embodiment the control system is employed in a situation in which it is desirable to maintain a fluid, for example, the oil in an engine crank case at a substantially constant temperature. This specific installation is used merely for purpose of illustrating the control principle whereby a substantially constant temperature may be maintained in situations requiring or using electric heater currents of high intensity for a plurality of thermostats. It will be obvious, therefore, that the principle can be applied to installations suitable for other situations wherein maintenance of substantially constant temperatures may be desirable in connection with mutually adjustable thermostats.

In Fig. 2 an engine crank case is indicated by the reference numeral 57. The lubricating oil from the crank case flows through heat exchange coil 58 and is returned to the crank case by means of pipe 59, pump 60, and pipe 61. The coil 58 is enclosed in a casing 62, through which drafts of air are intended to be passed either by means of a motor operated fan 63 or by the forward movement of the cooling system itself. The flow of air through the casing 62 is controlled by means of a damper 64, whose position is controlled by means of a reversible motor 65 substantially as disclosed in the previously described embodiment. In other words, the damper 63 is positioned by the operation of a motor to increase or diminish the flow of air through the casing 62. It will be understood that when the supply of air is diminished, the natural operation of the engine will increase the temperature of the oil passing through the cooling system. In order to maintain the circulating oil at a pre-determined and substantially constant temperature, a master thermostat designated 66 and a control thermostat designated 67 are both inserted in the conduit 59 so as to be influenced by the temperature of the circulating oil. In this respect, the conduit 59 and the oil therein can be regarded as the "space" referred to in connection with the previous embodiment. However, inasmuch as the "space" in the present modification is maintained at a substantially higher temperature than the space contemplated in the previous embodiment, a modified control system is provided principally to apply auxiliary heat to the control thermostat 67 simultaneously with the application of maximum heat to the master thermostat 66. Inasmuch as the modified embodiment of the invention includes the use of heater currents of greater intensity on the master thermostat, a relay is interposed in the heater circuits for both thermostats so as to prevent destructive sparking at the upper contacts of the thermostats.

In the modified installation the master thermostat 66 is provided with two contacts 68 and 69. The lower contact may be positioned at any location so as to be engaged by the mercury column during the entire operation of the control system. The upper contact 68, for the purpose of the present disclosure, is located to be closed when the temperature at the thermostat reaches 190°, that is to say, the normal operating temperature of the oil in duct 59 of approximately 100° plus 90° of added heat. However, the actual amount of added heat to the thermostat 66 may be as high as desired. For the present consideration it may be assumed that the total of 200° of heat may be added to the thermostat by means of its heater coil 70 in conjunction with the several resistors in circuit therewith as will be hereinafter described. The addition of 200° of auxiliary heat to the thermostat 66 insures quick adjustment of its mercury column to bring about engagement with the upper contact 68 so as to bring about the desired cycling action of the thermostat. The cycling action is produced by the making and breaking of an electric circuit at the contact 68 and thereby varying the intensity of electric current supplied to the heater coil 70.

The control thermostat is provided with three contacts 71, 72 and 73. The lower contact 71 may be located in any suitable position so as to be engaged by the mercury column during the entire operating period of the control system. The middle contact 72 is located to be engaged by the mercury column when the temperature at the thermostat rises to 280°, that is to say, the normal temperature of the oil of 100° plus 180° of auxiliary heat. The upper contact 73 is positioned to close when the temperature at the thermostat reaches 300°. It may be assumed that 400° of auxiliary heat may be added to the control thermostat by means of its heater coil 74 in conjunction with the cycle resistors, hereinafter mentioned, which are in circuit with said coil. It will be observed that the addition of 200° of auxiliary heat to the master thermostat 66 and the addition of 400° of auxiliary heat to the control thermostat 67, together with arrangement of their upper contacts substantially below the maximum theoretical range of the thermostat, make the control system highly sensitive to any change in the temperature of the oil in conduit 59.

The operation of the modified system is much the same as described in connection with the previous embodiments except that the modified system includes the operation of an additional relay and an arrangement of means whereby the heater coils of the master thermostat 66 and the control thermostat 67 may be heated simultaneously during certain periods of operation of the system. The modified embodiment also involves applying a greater amount of auxiliary heat to the master thermostat than was described in connection with the embodiment shown in Fig. 1.

The operating parts of the modified system may be briefly described as including the master and control thermostats 66 and 67, respectively, together with their heater coils 70 and 74, respectively, resistors 75, 76 and 77 for controlling the intensity of electric current to the coil 70, resistors 78 and 79 for controlling the intensity of electric current to the heater coil 74, relays 80, 81 and the additional relay 82, and the motor 65.

Assuming that the system is de-energized throughout, it is set into operation by the manual closing of a switch B in the negative line 83 to close an electric circuit through the coil of relay 80 and also circuits through the heater coils 70 and 74. The energizing circuit through the coil 80 includes the negative line 83, wire 84, resistor 85, wire 86, coil of the relay 80, and wire 87 to the positive line 89. The energization of relay 80 moves its armature 90 to a position to close an energizing circuit through one field of motor 65 whereby the motor is operated in a direction to adjust the damper 64 to reduce the flow of cooling air across the coil 58, and thereby permit the temperature of the oil therein to rise to the desired operating temperature. The said motor energizing circuit is as follows: negative line 83, wire 91, armature 92 of de-energized relay 81, wires 93 and 94, armature 90, energized relay 80, wires 95 and 96 through the "heat on" field 97 of the motor 65, thence through wire 98 to the negative line 89. When the said relay 80 is energized, there are established three possible parallel paths for the flow of electric current to the heater coil 70 of the master thermostat. One of said parallel paths leads from the relay 90 of the energized relay 80 through wire 95, cycle resistor 75, wire 96 and wire 97 through cycle resistor 76, wire 98, heater coil 70 and wire 99 to the positive line 89. The second, but most direct path, leads from armature 92 of de-energized relay 81, wires 93, 94 and 100, relay armature 101 of de-energized relay 82, thence through wire 96, cycle resistor 76, wire 98, coil 76, and wire 99 to the positive line 89.

The third circuit path leads from armature 92 of de-energized relay 81, through wires 93 and 94, variable cycle resistor 77, wire 97, cycle resistor 76, wire 98, coil 70, and wire 99 to the positive line 89. During the initial heat-up of the system, and at all other times when the relay 82 is de-energized, the second circuit path above described, including the single resistor 76, is in control of the heater coil 70. However, when the relay 82 is energized, the circuit through the heater coil 70 is altered so that the resistor 75 is connected in series with resistor 76 through the said heater coil 70, so as to substantially reduce the intensity of the electric current supplied to the heater 70. The third circuit path is also effective when the relay 82 is energized to direct additional current through the variable resistor 77 which is connected in series with the resistor 76.

Simultaneously with the establishment of heat-up circuits for the master thermostat coil 70, a heat-up circuit is established through the heater coil 74 of control thermostat 67. This heat-up circuit leads from the armature 90 of energized relay 80 through wires 95 and 102, through variable resistor 79, wires 103 and 104, heater coil 74 and wire 105 to the positive line 89. The windings of resistor 79 in conjunction with the heater coil 74 are such as to apply approximately 200° of auxiliary heat to the control thermostat 67. It will be seen, therefore, that during the initial heat-up of the system the auxiliary heat applied to the master thermostat and the control thermostat is approximately equal.

The heat-up of the thermostats 66 and 67 will continue at the above rate until the mercury column of the master thermostat 66 engages the 190° contact 68. When the mercury column of thermostat 67 engages its said upper contact 68, the relay 82 is energized by a circuit leading from armature 92 of deenergized relay 81, through wires 93, 94 and 106 to the coil of said relay 82, thence through wire 107, contact 69, mercury column of thermostat 66, contact 68, and wires 108 and 99 to the positive line 89. The energization of the said relay 82, as previously indicated, opens the direct heater circuit through coil 70 and permits the introduction of two additional resistors 75 and 77 to be introduced in series with the resistor 76, and therefore reduces the heating effect on the coil 70 so as to cause the mercury column to recede from the contact 68 of the master thermostat. The closing of said relay 82 also establishes an additional circuit through the heater coil 74 of the control thermostat 67 so as to apply more auxiliary heat to the said control thermostat. This heater circuit leads from armature 101 of energized relay 82, through wire 109, resistor 78, wire 104, heater coil 74, and wire 105 to the positive line 89. This additional heating circuit through the heater coil 74 is established only momentarily because of the fact that the cooling effect on the master thermostat 66, because of the reduced intensity of electric current through its coil 70, causes the mercury column of master thermostat 66 to recede from its contact 68, and therefore again de-energize relay 82. This cycling action of the master thermostat 66 applies impulses of additional heat to the control thermostat 67 until the temperature at the control thermostat reaches 280° so as to cause its mercury column to engage the middle contact 72. The engagement of the mercury column with the said contact 72 closes a circuit which by-passes the electric current around the coil of relay 80 so as to de-energize this relay. The by-pass circuit is as follows: negative line 83, wire 84, resistor 85, wires 86 and 110 to the middle contact 72 of control thermostat, thence through the mercury column to contact 71 and wire 111 to the positive line 89. If the temperature of the oil in conduit 59 has risen to a point near its normal temperature of 180°, the mercury column of control thermostat will remain in the space between contacts 72 and 73 thereof. However, if the temperature of the oil in conduit 59 is substantially below the normal temperature desired, the opening of the circuit at the armature 90 of relay 80 removes the heater circuit including the resistor 79 from the heater circuit of the control thermostat. The mercury column of the thermostat will, therefore, recede from the middle contact and again effect re-energization of the relay 80 so as to re-establish the heater circuit of full intensity for the coil 74. The thermostats 66 and 67 will cycle in the above manner until the temperature of the oil in conduit 59 plus the auxiliary heat applied to master thermostat 66 and control thermostat 67 is sufficient to maintain the mercury column of the master thermostat at a position near its contact 68, and to maintain the mercury column of control thermostat within the temperature range defined by the contact 72 and the contact 73. The position of the mercury column of master thermostat 66, being maintained in close relation to the contact 68, increases the frequency of its cycling action and consequently increases the frequency of the heat impulses applied to the control thermostat 67. When the system is in substantial balance so as to maintain the oil at a substantially constant temperature, the frequency of the cycling action of the master thermostat 66 will be sufficient together with the temperature of the oil to maintain the mercury column of control thermostat 67 within the temperature range of 20° as defined by the contacts 72 and 73. However, if the temperature of the oil should increase slightly above the normal temperature desired, this increase in temperature will be sufficient to raise the mercury column of control thermostat up to the upper limits of said temperature range so as to engage the upper contact 73 of the thermostat. When this condition takes place, an energizing circuit is established through the coil of relay 81 as follows: from negative line 83, through the coil of relay 81, thence through wire 112 to contact 73 of control thermostat, thence through the mercury column to the lower contact 71, and thence through wire 111 to the positive line 89. The energization of relay 81 in the above manner closes an energizing circuit through the motor 65 to operate the motor in the reverse direction so as to impart through the chain belt 113 an adjusting movement to the damper 64 to increase the flow of cooling air through the casing 62 so as to effect a cooling action on the oil. This motor energizing circuit includes negative line 83, armature 92 of energized relay 81, wire 114, "heat off" field 115 of motor 65, thence through the motor armature and wire 98 to the positive line 89. The energization of relay 81 will be only momentary because the energization of relay 81 also functions to open all circuits, then available, for directing current to the heater coils 70 and 74 of both thermostats. The cooling effect on both thermostats will result in an abrupt recession of the mercury columns of said thermostats from their upper contacts and thereby break the last mentioned motor energizing circuit. However, the damper 64 will remain in its said adjusted position so that the cooling effect on the oil will continue. However, if this cooling effect is insufficient to prevent the mercury column of control thermostat 67 from again reaching the upper contact 73, the re-engagement of the column with said upper contact will again re-energize the "heat off" circuit of the motor 65 so as to impart a further adjustment to valve 64 to permit a greater volume of air to pass through casing 62. These adjustments will continue until the heat transfer is such that the control system will remain in balance with the mercury column of the control thermostat oscillating in the temperature range defined by contacts 72 and 73 without effecting engagement with either of said contacts.

It will be seen from the description of the modified embodiment that the thermostats 66 and 67 function to adjust each other under pre-determined conditions in substantially the same manner as that disclosed in connection with the embodiment in Fig. 1. It would also be apparent that the system, as herein shown or as modified to vary the amount of auxiliary heat applied to the respective thermostats, may be employed in various situations where it is desirable to maintain a space at a relatively high but substantially constant temperature.

In Fig. 4 is illustrated a modified embodiment employed in a situation such as illustrated in Fig. 1 to maintain a uniform temperature of a space. This embodiment, however, employs only one thermostat, to wit, a control thermostat for controlling the operation of the reversible motor which in turn controls the supply of heated or cooled air to the space.

The mechanism for supplying the heated or cool air to the space of the present embodiment is preferably identical with the illustration in Fig. 1 and includes a conduit 10 having a partition 11 so as to divide the conduit into two passages, in one passage is arranged a heating element 12, and a cooling element 13 is positioned in the other passage. The damper for controlling the supply of heated or cooled air is designated by the reference numeral 14. In one extreme position of the damper, for example position 14ª indicated in dotted lines, only heated air can be introduced into the space. In the other extreme position 14ᵇ only cooled air can be introduced into the space. However, when the damper is in any intermediate position, both heated and cooled air are admitted in proportion, determined by the position of the damper. The operation of the damper is modulated by means of a reversible motor designated 15ᶜ whose movements are controlled in relation to the temperature of the controlled space. If the said space is maintained at a desired temperature, the damper operated motor 15ᶜ will remain inactive. If there should be a slight change in the temperature of the space, the control motor 15ᶜ will be operated in the proper direction to effect a compensating adjustment of the damper so as to increase or reduce the supply of heat to the space as may be required to balance the control of the system. The system illustrated in Fig. 4 includes certain of the control elements indicated in Fig. 1, but are here designated by the same reference numeral with the addition of the exponent c, to wit, the control thermostat is designated 17c and corresponds to the control thermostat 17 of Fig. 1. The relays 18c and 19c correspond, respectively, to the relays 18 and 19 of Fig. 1 and the motor 15c together with its fields 39c, 56c and the limit switches 42c and 55c may be, and preferably are, the same as illustrated in Fig. 1 Assuming that the space being heated is to be maintained at a temperature of 76° and that the actual temperature is substantially below 76°, the manual closing of the switch A will establish an energizing current through the negative line 32c, the armature 33c of the de-energized relay 19c, wire 34c, adjustable resistor 23c, wire 47c, heater 27c and wire 48c to the negative line 41c. The resistor 23c is preferably adjustable so that any desired amount of temperature can be applied to the auxiliary heater 27c of the thermostat. Preferably the said resister 23c is so adjusted so as to apply approximately 400° of heat to the said auxiliary heater. Simultaneously with the establishing of the above circuit through heater 27c an energizing circuit is established through one side of the reversible motor 15c as follows: from the armature 33c of de-energized relay 19c, wire 34c, wire 36c, armature 37c of de-energized relay 18c, wire 38c, limit switch 42c, and field 39c of motor 15c, and thence through wire 40c to the negative line 41c. In view of the fact that the temperature of the room is substantially below the desired temperature of 76°, the last mentioned circuit will result in moving the damper 14 to the position 14a whereby the maximum amount of heated air will be supplied to the space. By the movement of said motor 15c to its limit in one direction, the limit switch 42c will be opened. Therefore, the maximum amount of heat will be supplied to the space until the temperature thereof is raised to approximately 76°. The motor and damper will remain in their extreme "heat on" position so as to supply the maximum amount of heated air to the space being controlled. When the relay 18c is de-energized so as to close one circuit through the motor 15c, it also establishes a circuit for supplying additional heat to the auxiliary heater 27 of the thermostat. This circuit includes wire 116, cycle resistor 117, wire 118 to wire 47c, and thence through the heater 27c and wire 48c to the negative line 41c. The resistor 117 may be designed to supply any desired amount of electric current to the auxiliary heater 27c of the thermostat which is less than the current supplied through the resistor 23c. Preferably, the current supplied by resistor 117 is relatively small, for example current sufficient to add 4° of heat to the auxiliary heater 27c.

After the motor 15c has been moved to its extreme "heat-on" position, nothing will happen until the mercury column of thermostat 17c engages the contact 29c. At this point the circuit will be established through the relay 18c to break the motor circuit at that point. However, there is no change made in so far as the temperature of the room is concerned, until the mercury column engages the upper contact 30c. At this time a circuit is established through negative line 32c, branch 50c, mercury column of the thermostat, contact 30c, wire 52c, through the energizing coil of relay 19c, and thence through wire 53c to the negative line 41c. This circuit energizes the relay 19c so as to draw its armature 33c against the contact to close an energizing circuit through the "heat-off" field of motor 15c, thereby imparting an adjusting movement to the damper 14 in a direction to admit a quantity of cooled air into the space being controlled. This motor energizing circuit includes the negative line 32c, the armature 33c of the energized relay 19c, wire 54c, limit switch 55c, motor field 56c, armature of motor 15c, and thence through wire 40c to the negative line 41c. This motor energizing circuit will be only momentary, since the energization of the relay 19c breaks the circuit through the auxiliary heater 27c at the relay armature 33c. Consequently, the mercury column will recede from the contact 30c and, therefore, deenergize the relay 19c, thereby reestablishing the heating circuit through the auxiliary heater 27c so as to cause the mercury column to again rise into engagement with the upper contact 30c of the thermostat. This cycling action will continue until a series of momentary operations of motor 15c adjust the damper 14 so as to supply sufficient cooled air to the space to maintain the temperature of the space near the point desired and thereby maintain the mercury column of the thermostat at a location intermediate the contacts 29c and 30c. If there should be a sudden drop in temperature of the space sufficient to carry the mercury column below the contact 29c of the thermostat, the relay 18c will be de-energized, so as to establish a reversing circuit through the motor 15c for the purpose of increasing the application of heat to the space. When the said mercury column drops below the contact 29c, the resistor 117 is made effective, by the de-energization of relay 18c, to supply additional current to the auxiliary heater 27c so that this additional current in conjunction with the current passing through the resistor 23c will quickly raise the temperature at the thermostat to a position above the contact 29c.

The resistor 23c is made adjustable and corresponds to the resistor 23 of the embodiment shown in Fig. 1 so that the temperature band as defined by the space between contacts 29c and 30c may be raised or lowered by varying the resistance and thereby raise or lower the point at which the temperature of the space is to be controlled.

We claim:

1. In a temperature control system, movable mechanism adapted to be adjustably positioned to raise or lower the temperature of a space, means including a mercury column thermostat operable at lower and upper limits of a fixed temperature range to energize said movable mechanism to effect adjusting movements thereof, an auxiliary electric heater for said thermostat, and means for varying the intensity of electric current through said heater to vary the effective position of said fixed temperature range at the thermostat relative to the temperature of the space being controlled.

2. In a temperature control system, movable mechanism adapted to be adjustably positioned to raise or lower the temperature of a space, means including a thermostat operable at lower and upper limits of a fixed temperature range at the thermostat to energize said movable mechanism to effect adjusting movements thereof, an auxiliary heater for said thermostat, means including a second thermostat responsive to temperature changes and functioning at a pre-determined temperature at the thermostat to close an energizing circuit through said electric heater to adjust said first mentioned thermostat to a functioning position within said temperature range, an auxiliary electric heater for said second thermostat and a plurality of energizing circuits for the last mentioned heater, one of said circuits being made ineffective by the functions of said second thermostat.

3. In a temperature control system, movable mechanism adapted to be adjustably positioned to raise or lower the temperature of a space, means including a thermostat operable at lower and upper limits of a fixed temperature range at the thermostat to energize said movable mechanism to effect adjusting movements thereof, an auxiliary heater for said thermostat, means including a second thermostat responsive to temperature changes and functioning at a pre-determined temperature at the thermostat to close an energizing circuit through said electric heater to adjust said first mentioned thermostat at a functioning position within said temperature range, an auxiliary electric heater for said second thermostat, a plurality of energizing circuits for the last mentioned heater, one of said circuits being made ineffective by the functions of said second thermostat, and means controlled by the functioning of the first mentioned thermostat for controlling the energization of another of said parallel circuits through said heater of the second thermostat.

4. In a temperature control system, movable mechanism adapted to be adjustably positioned to raise or lower the temperature of a space, means including a thermostat operable at lower and upper limits of a fixed temperature range at the thermostat to energize said movable mechanism to effect adjusting movements thereof, an auxiliary heater for said thermostat, means including a second thermostat responsive to temperature changes and functioning at a pre-determined temperature at the thermostat to close an energizing circuit through said electric heater to adjust said first mentioned thermostat at a functioning position within temperature range, an auxiliary electric heater for said second thermostat, a plurality of energizing circuits for the last mentioned heater, one of said circuits being made ineffective by the functions of said second thermostat, and means controlled by the functioning of the first mentioned thermostat at the lower limit of its temperature range for opening another of said parallel circuits through the heater of the second thermostat.

5. In a temperature control system, movable mechanism adapted to be adjustably positioned to raise or lower the temperature of a space, means including a control thermostat operable at lower and upper limits of a fixed temperature range at the thermostat to energize said movable mechanism to effect adjusting movements thereof, an auxiliary heater for the control thermostat, a master thermostat for controlling the supply of electric current to the auxiliary heater of said control thermostat, an auxiliary heater for the master thermostat, and means controlled by the functioning of the control thermostat at the upper limit of said temperature range for de-energizing the heater circuits for both thermostats.

6. In a temperature control system, movable mechanism including a reversible electric motor, a relay for closing an energizing circuit through the motor to adjust its position in one direction, a second relay for closing a circuit through the motor to adjust its position in the opposite direction, a control thermostat adapted to function at the lower and upper limits of a temperature range at the thermostat to control the said relays, an auxiliary electric heater for the control thermostat, and means for adjusting the control thermostat to a position within said temperature range including a master thermostat responsive to the temperature of said space, an auxiliary electric heater for the master thermostat whereby it is caused to function at a temperature higher than that of said space, and means effective when the control thermostat moves below said temperature range to apply electric energy to the heater of said master thermostat.

7. In a temperature control system, movable mechanism including a reversible electric motor, a relay for closing an energizing circuit through the motor to adjust its position in one direction, a second relay for closing a circuit through the motor to adjust its position in the opposite direction, a control thermostat adapted to function at the lower and upper limits of a temperature range at the thermostat to control the said relays, an auxiliary electric heater for the control thermostat, and means for adjusting the control thermostat to a position within said temperature range including a master thermostat, an auxiliary electric heater for the master thermostat, means for varying the intensity of electric current to the heater when the control thermostat is operating within he said temperature range, and means actuated by movement of the control thermostat to a position below said temperature range to supply additional electric current to the heater of said master thermostat.

8. In a temperature control system, movable mechanism including a reversible electric motor, a relay for closing an energizing circuit through the motor to adjust its position in one direction, a second relay for closing a circuit through the motor to adjust its position in the opposite direction, a control thermostat adapted to function at the lower and upper limits of a temperature range at the thermostat to control the said relays, an auxiliary electric heater for the control thermostat, and means for adjusting the control thermostat to a position within said temperature range including a master thermostat, an auxiliary electric heater for the master thermostat, means for varying the intensity of electric current to the heater when the control thermostat is operating within the said temperature range, means actuated by movement of the control thermostat to a position below said temperature range to supply additional electric current to the heater of said master thermostat, and means actuated by the functioning of the control thermostat at the upper limit of said temperature range to de-energize the auxiliary heaters of both thermostats.

9. In a temperature control system, movable mechanism including a reversible electric motor, a relay for closing an energizing circuit through the motor to adjust its position in one direction, a second relay for closing a circuit through the motor to adjust its position in the opposite direction, and means for controlling the energization of said relays comprising a pair of mutually adjustable thermostats of the mercury column type adapted to function at different temperatures at the thermostats for effecting the mutual adjustments thereof.

10. In a temperature control system, movable mechanism adapted to be adjustably positioned in opposite directions to vary the rate of heat transfer to or from a space, and means including a pair of thermostats for controlling the movements of said mechanism; each thermostat being provided with an auxiliary heater, and electrically energized means controlled by the functioning of each thermostat adapted to make or break electric circuits through the auxiliary heater of the other thermostat.

11. In a temperature control system, movable mechanism adapted to be adjustably positioned in opposite directions to vary the rate of heat transfer to or from a space, and means including a pair of mutually adjustable thermostats for controlling the movements of said mechanism, auxiliary electric heaters for each thermostat, means for simultaneously applying energizing current to said heaters, and means actuated by the functioning of one thermostat for altering the intensity of electric current supplied to the other thermostat.

12. In a temperature control system, movable mechanism adapted to be adjustably positioned in opposite directions to vary the rate of heat transfer to or from a space, means including a pair of mutually adjustable thermostats for controlling the movements of said mechanism, auxiliary heaters for each of the thermostats, means for simultaneously applying energizing current to said heaters, and means actuated by the functioning of each thermostat for altering the intensity of the electric current supplied to the heater of the other thermostat.

TIMOTHY J. LEHANE.
EVERETT H. BURGESS.